(12) United States Patent
Ohmiya (10) Patent No.: US 8,378,824 B2
(45) Date of Patent: *Feb. 19, 2013

(54) IMAGE-FORMING SYSTEM

(75) Inventor: Takashi Ohmiya, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 495 days.

This patent is subject to a terminal disclaimer.

(21) Appl. No.: 12/579,777

(22) Filed: Oct. 15, 2009

(65) Prior Publication Data

US 2010/0127838 A1    May 27, 2010

(30) Foreign Application Priority Data

Nov. 27, 2008  (JP) ................................. 2008-302857

(51) Int. Cl.
- *G06F 17/00* (2006.01)
- *G06K 5/00* (2006.01)
- *H04N 1/00* (2006.01)
- *H04Q 5/22* (2006.01)
- *G08B 13/14* (2006.01)

(52) U.S. Cl. ............. 340/572.1; 340/10.1; 340/539.1; 235/375; 235/382; 358/1.14; 358/1.11; 358/401

(58) Field of Classification Search .................... None
See application file for complete search history.

(56) References Cited

U.S. PATENT DOCUMENTS

| | | | |
|---|---|---|---|
| 5,640,253 A * | 6/1997 | Uchida et al. ................. | 358/501 |
| 6,334,717 B1 * | 1/2002 | Uchida et al. ................. | 358/1.13 |
| 6,827,279 B2 | 12/2004 | Teraura | |
| 7,731,093 B2 | 6/2010 | Isemura et al. | |
| 7,832,635 B2 | 11/2010 | Owaku | |
| 8,186,574 B2 * | 5/2012 | Tsuzuki ........................ | 235/375 |
| 2002/0170973 A1 | 11/2002 | Teraura | |
| 2005/0029353 A1 | 2/2005 | Isemura et al. | |
| 2005/0094183 A1 * | 5/2005 | Kojima .......................... | 358/1.14 |
| 2005/0108559 A1 * | 5/2005 | Suzuki et al. ................. | 713/193 |
| 2005/0141009 A1 * | 6/2005 | Kiwada ......................... | 358/1.14 |
| 2005/0200910 A1 * | 9/2005 | Kanoshima et al. .......... | 358/448 |

(Continued)

FOREIGN PATENT DOCUMENTS

| | | |
|---|---|---|
| JP | 2000322528 A | 11/2000 |
| JP | 2002-337426 | 11/2002 |

(Continued)

OTHER PUBLICATIONS

Japanese Office Action dated Dec. 7, 2010 together with English language translation.

(Continued)

*Primary Examiner* — Jennifer Mehmood
*Assistant Examiner* — Fekadeselassie Girma
(74) *Attorney, Agent, or Firm* — Scully Scott Murphy & Presser PC (57) ABSTRACT

An image-forming system includes a data-reading unit, a data-writing unit, and a restricting unit. The data-reading unit reads additional data from a first storing member of an original document. The data-writing unit writes the read additional data to a second storing member of a recording medium. The restricting unit gives a restriction to the additional data stored in the first storing member after the additional data is read, in order to prevent the additional data stored in the first storing member from being read subsequently.

13 Claims, 7 Drawing Sheets

U.S. PATENT DOCUMENTS

| | | | |
|---|---|---|---|
| 2006/0278703 A1 | 12/2006 | Owaku | |
| 2007/0083381 A1* | 4/2007 | Farrell et al. | 705/1 |
| 2007/0230986 A1* | 10/2007 | Miyata | 399/84 |
| 2008/0239406 A1 | 10/2008 | Nakano | |
| 2010/0127068 A1* | 5/2010 | Tsuzuki | 235/375 |

FOREIGN PATENT DOCUMENTS

| | | |
|---|---|---|
| JP | 2006-94037 (A) | 4/2006 |
| JP | 2007-13940 (A) | 1/2007 |
| JP | 2007-60220 (A) | 3/2007 |
| JP | 2008-244880 (A) | 10/2008 |
| JP | 4174401 (B2) | 10/2008 |
| JP | 2010-86388 (A) | 4/2010 |
| JP | 2010-130346 (A) | 6/2010 |

OTHER PUBLICATIONS

Japanese Office Action mailed Feb. 15, 2011 in corresponding Japanese Patent Application No. 2008-302857 together with English language translation.

* cited by examiner

IMAGE-FORMING SYSTEM

CROSS REFERENCE TO RELATED APPLICATION

This application claims priority from Japanese Patent Application No. 2008-302857 filed Nov. 27, 2008. The entire content of this application is incorporated herein by reference.

TECHNICAL FIELD

The present invention relates to an image-forming system and an image-forming device.

BACKGROUND

Printers using a recording medium with an attached storage unit (a sheet of paper with a radio frequency identification (RFID) tag attached thereto, for example) are well known in the art. This type of printer can read RFID data from the RFID tag in an original document while scanning an original image from the document, and can write this RFID data to the REID tag of a separate printing sheet while reproducing the original image on the printing sheet.

SUMMARY

However, one disadvantage of this conventional printer is that the printer can easily generate multiple sheets of REID paper having the same RFID data written thereto.

In view of the foregoing, it is an object of the present invention to provide an image-forming system and an image-forming device capable of restraining the unlimited production of recording media with storage units having the same storage data (such as RFID data) written therein.

In order to attain the above and other objects, the invention provides an image-forming system including a data-reading unit, a data-writing unit, and a restricting unit. The data-reading unit reads additional data from a first storing member of an original document. The data-writing unit writes the read additional data to a second storing member of a recording medium. The restricting unit gives a restriction to the additional data stored in the first storing member after the additional data is read, in order to prevent the additional data stored in the first storing member from being read subsequently.

Another aspect of the present invention provides an image-forming device including a data-reading unit, a data-writing unit, and a restricting unit. The data-reading unit reads additional data from a first storing member of an original document. The data-writing unit writes the read additional data to a second storing member of a recording medium. The restricting unit gives a restriction to the additional data stored in the first storing member after the additional data is read, in order to prevent the additional data stored in the first storing member from being read subsequently.

BRIEF DESCRIPTION OF THE DRAWINGS

The particular features and advantages of the invention as well as other objects will become apparent from the following description taken in connection with the accompanying drawings, in which.

DETAILED DESCRIPTION

Next, a preferred embodiment of the present invention will be described while referring to the accompanying drawings.

Internal Structure of a Multifunction Peripheral

Figure 1:
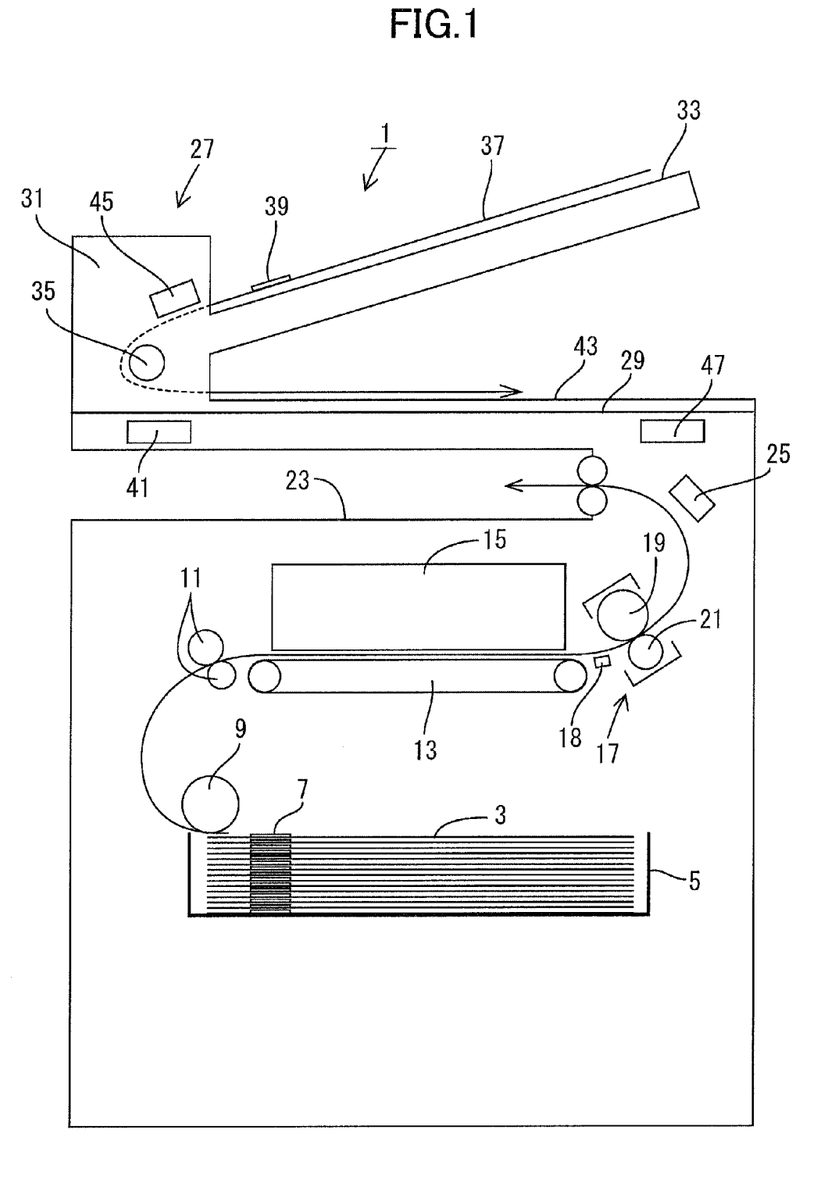
FIG. 1 is a conceptual image showing an internal structure of a MFP according to a preferred embodiment.

FIG. 1 is a conceptual image showing the internal structure of a multifunction peripheral (hereinafter abbreviated as "MFP") 1, serving as the preferred embodiment of the image-forming device according to the present invention. A tray 5 is disposed in the bottom section, of the MFP 1 for accommodating sheets 3 of a paper, for example, to be used in printing operations. The sheets 3 may include sheets with RFID (radio frequency identification) tags 7, and sheets without RFID tags 7. The RFID tags 7 in the sheets 3 may be embedded in the sheets 3 or attached to the surfaces of the sheets 3.

A pickup roller 9 disposed above one end of the tray 5 picks up and conveys the sheets 3 accommodated in the tray 5 to a pair of registration rollers 11 one sheet at a time. After the sheet 3 is conveyed to the registration rollers 11, the registration rollers 11 adjust the registration of the sheet 3 and convey the sheet 3 onto a conveying belt 13 at a prescribed timing. Once the sheet 3 is conveyed onto the conveying belt 13, the conveying belt 13 continues to convey the sheet 3 while an image-forming unit 15 forms an image (a monochrome image or a color image) on the sheet 3 based on image data generated by a document-reading unit 27. Once the image-forming unit 15 has formed an image on the sheet 3, the conveying belt 13 conveys the sheet to a fixing unit 17. The fixing unit 17 has a heating roller 19 and a pressure roller 21 for pinching and conveying the sheet 3. As the sheet 3 passes between the heating roller 19 and pressure roller 21, the image formed on the sheet 3 is fixed to the sheet 3 by heat. Subsequently, the sheet 3 is discharged onto a discharge tray 23. A sensor 18 is also disposed near the fixing unit 17 for detecting when the sheet 3 has reached the fixing unit 17.

In addition, an RFID reader/writer 25 for sheets being printed is disposed near a conveying path between the fixing unit 17 and the discharge tray 23. The RFID reader/writer 25 can communicate wirelessly with (read data from or write data to) the RFID tag 7 in a sheet 3 being conveyed through radio waves emitted from an antenna (not shown).

A document-reading unit 27 is disposed above the discharge tray 23. The document-reading unit 27 includes a document bed 29 and a document cover 31 disposed on the document bed 29 and capable of rotating open and closed thereon. The document cover 31 includes a document tray 33 in which an original document 37 having one or more sheets may be set, a conveying mechanism 35 for conveying sheets of the original document 37 one at a time to be scanned by the scanning unit 41, and a document discharge tray 43 for receiving the sheets conveyed by the conveying mechanism 35. The original document 37 may include sheets with or without RFID tags 39.

As the method of scanning an original image from the original document 37, the MFP 1 may either scan a document on the document bed 29 (hereinafter referred to as "scanning a stationary document") or a document conveyed by the conveying mechanism 35 (hereinafter referred to as "scanning a conveyed document"). When scanning a stationary document, the user places one page of the original document 37 on the document bed 29 and closes the document cover 31. Once the user issues a command to begin scanning the original, the scanning unit 41 moves under the document bed 29 while reading the original image on the original document 37 to generate original image data, and subsequently transmits this original image data to the CPU 51. When scanning a conveyed document, the user sets one or a plurality of pages of the original document 37 in the document tray 33 and issues an instruction to begin scanning the original. At this time, the conveying mechanism 35 conveys the original document 37 one sheet at a time through the scanning region of the scanning unit 41, discharging each sheet in turn onto the document discharge tray 43. While the original document 37 is being conveyed, the scanning unit 41 reads the original image on the original document 37 and generates original image data that is subsequently transmitted to the CPU 51.

An RFID reader/writer 45 for original documents is disposed near the conveying path along which the original document 37 is conveyed between the document tray 33 and the scanning unit 41. If the sheet of the RFID reader/writer 45 being conveyed on the conveying path has an RFID tag 39, the RFID reader/writer 45 can exchange data with the RFID tag 39 through wireless communications. An additional RFID reader/writer 47 for original documents is disposed near the document discharge tray 43. The RFID reader/writer 47 is capable of exchanging data with the RFID tag 39 of the original document 37 discharged on the document discharge tray 43.

Electrical Structure of the MFP

Figure 2:
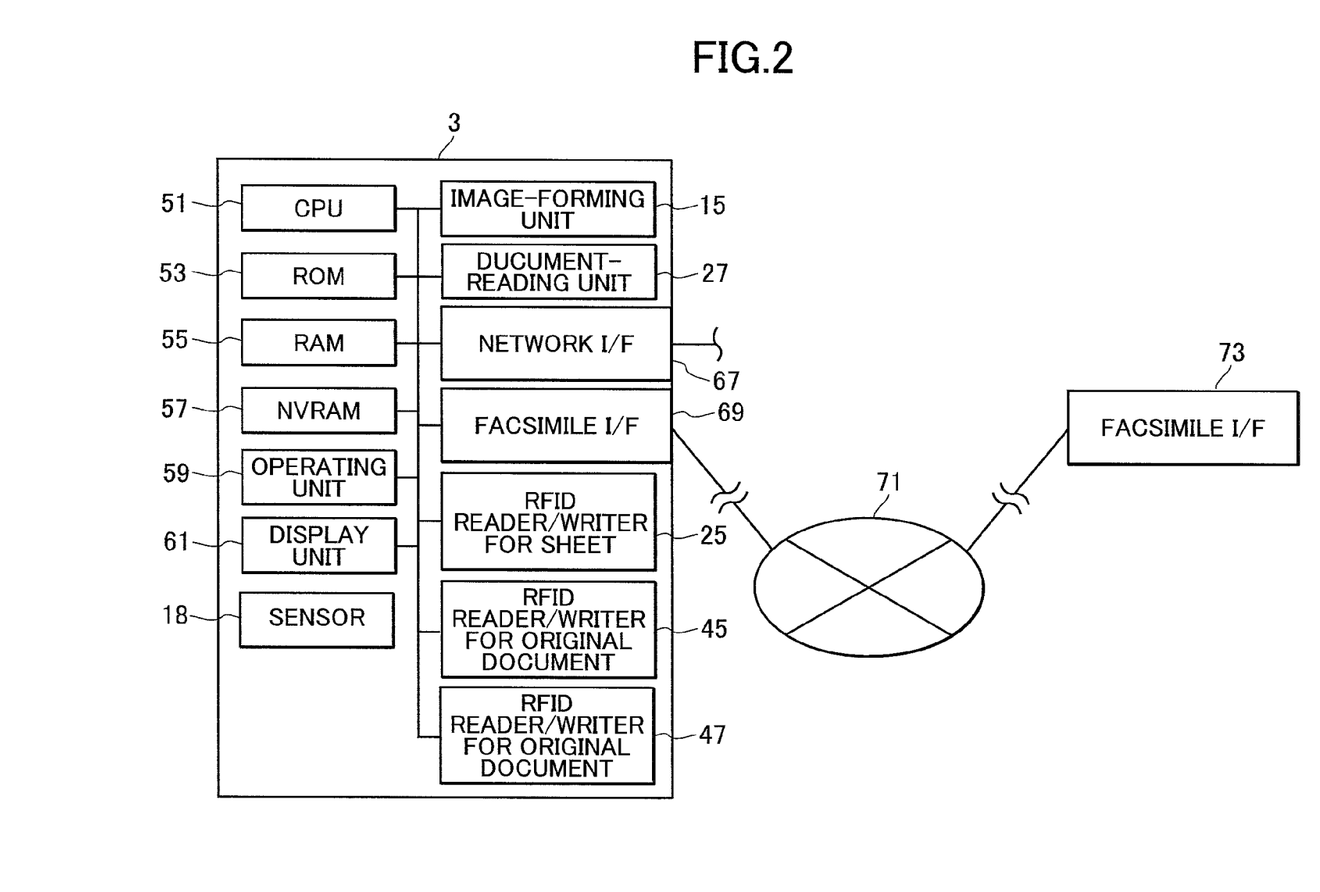
FIG. 2 is a block diagram showing an electrical structure of the MFP according to the preferred embodiment.

FIG. 2 is a block diagram showing the electrical structure of the MFP 1. The MFP 1 includes a CPU 51, a ROM 53, a RAM 55, an NVRAM 57 (nonvolatile memory), an operating unit 59, a display unit 61, the image-forming unit 15, and the document-reading unit 27. The ROM 53 stores programs for executing various operations on the MFP 1, such as a data transfer process described later. The CPU 51 reads programs from the ROM 53 and executes the programs to perform various control processes while storing the results of operations in internal memory (the RAM 55 or NVRAM 57). The operating unit 59 includes a plurality of buttons by which the user can perform input operations. The display unit 61 includes a liquid crystal display for displaying configuration screens, the status of device operations, and the like; and indicator lamps.

The MFP 1 also includes a network interface 67 and a facsimile interface 69. The network interface 67 connects the MFP 1 to an external computer (not shown) or the like via a network, enabling bi-directional communications between the two devices. The facsimile interface 69 connects the MFP 1 to another external device 73 having a facsimile function via a public telephone network 71, enabling facsimile communications between the two devices.

The CPU 51 also controls the RFID reader/writer 25 for sheets being printed, and the RFID reader/writers 45 and 47 for original documents described above.

Data Transfer Process

Figure 3:
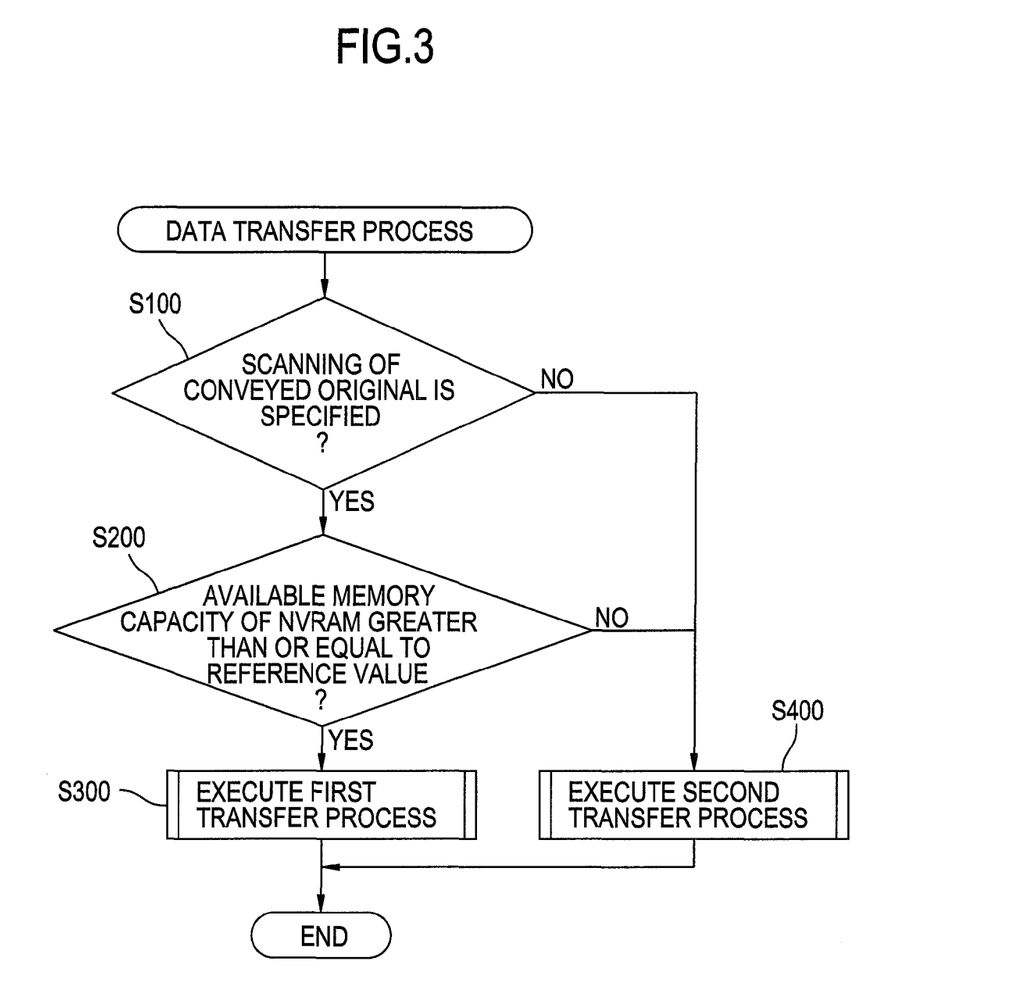
FIG. 3 is a flowchart illustrating steps in a data transfer process according to the preferred embodiment.
Figure 4:
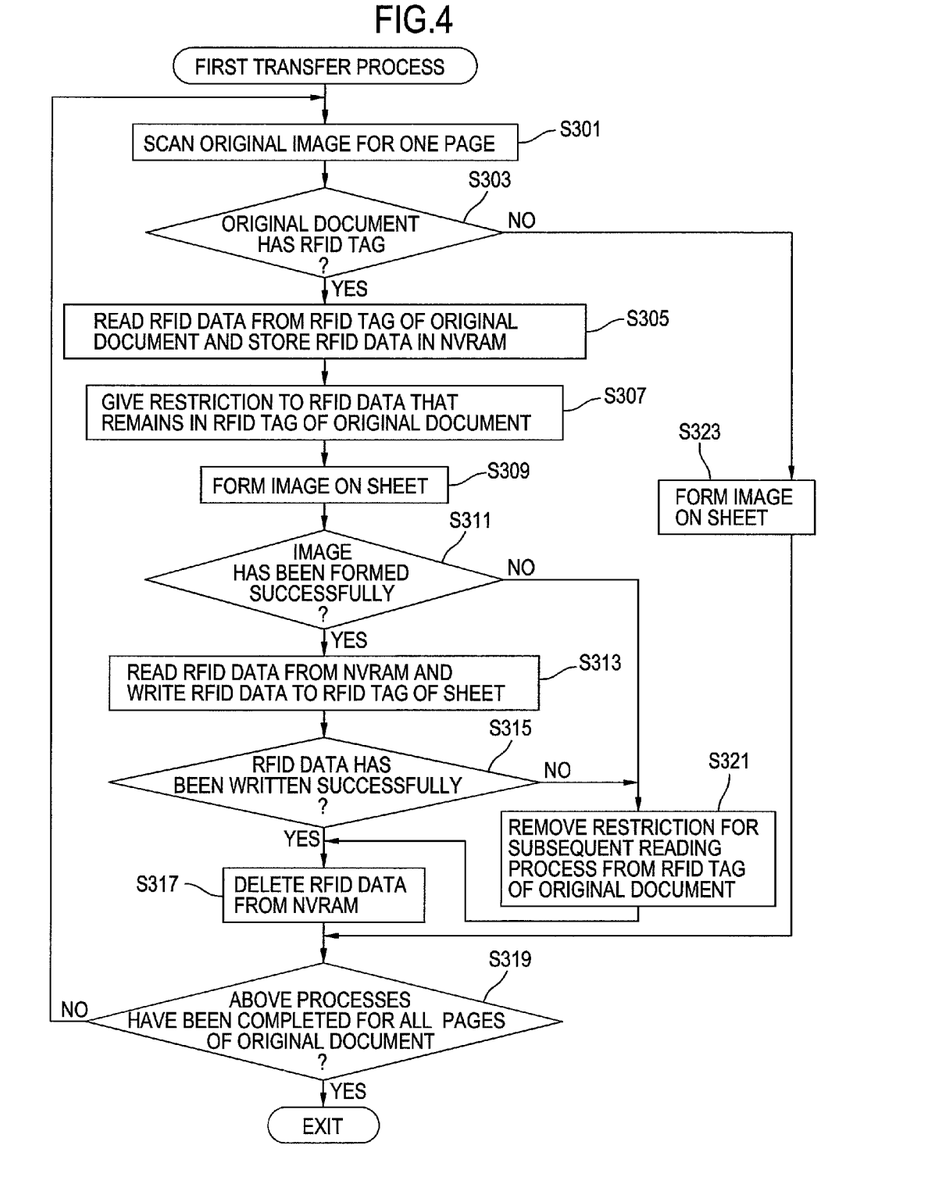
FIG. 4 is a flowchart illustrating steps in a first data transfer process according to the preferred embodiment.
Figure 5:
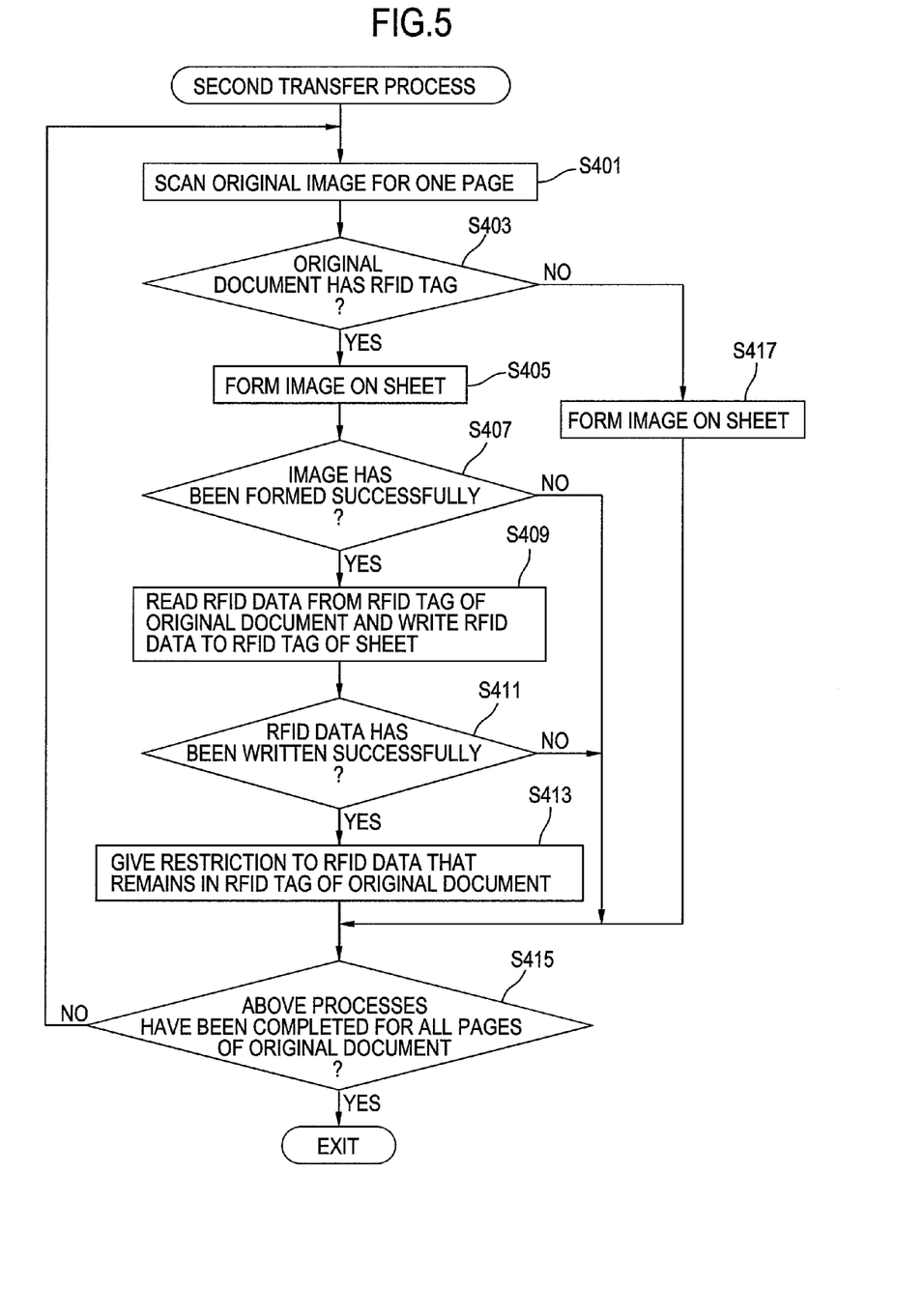
FIG. 5 is a flowchart illustrating steps in a second data transfer process according to the preferred embodiment.
Figure 6:
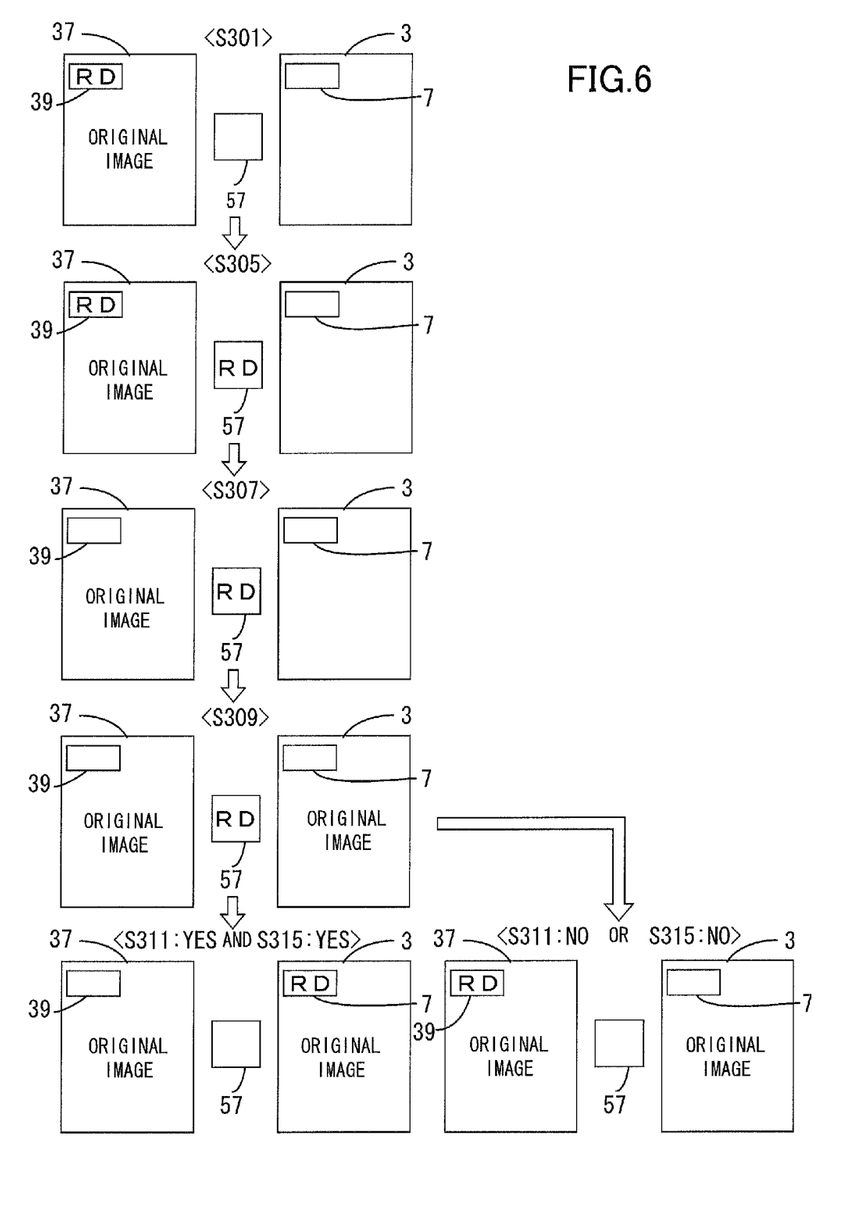
FIG. 6 conceptually illustrates the first data transfer process according to the preferred embodiment.
Figure 7:
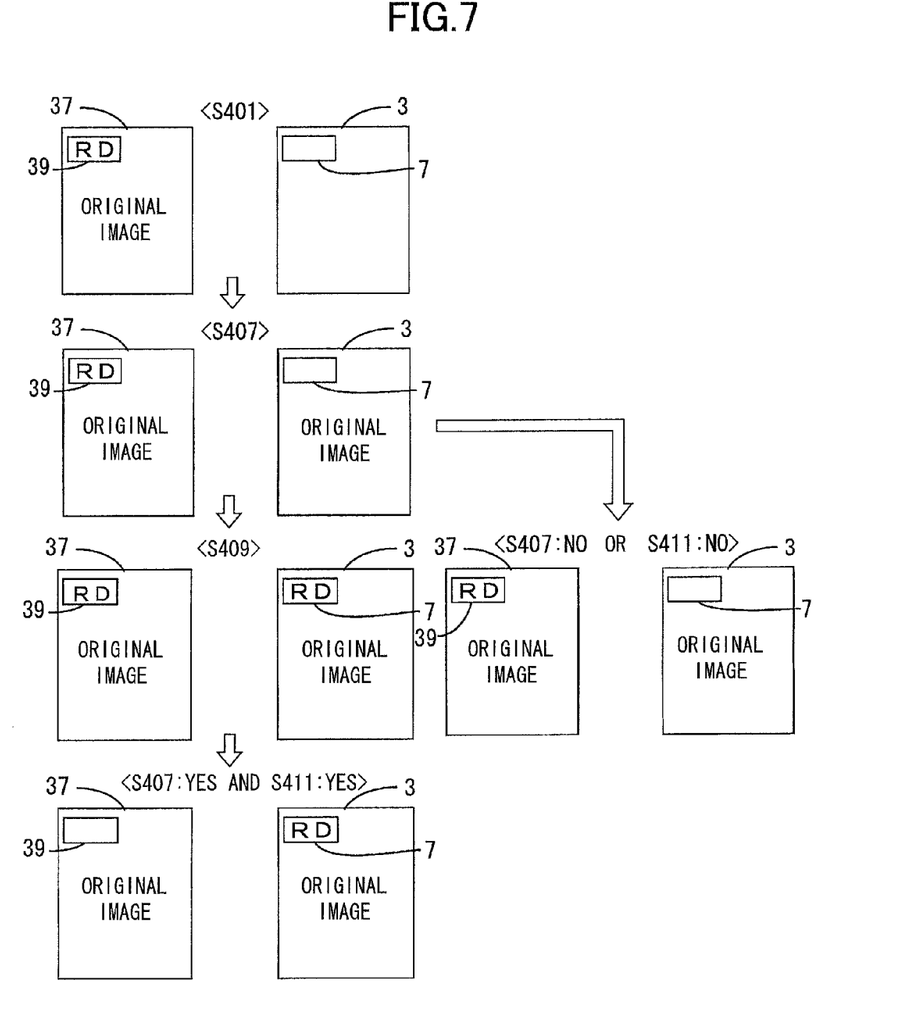
FIG. 7 conceptually illustrates the second data transfer process according to the preferred embodiment.

FIGS. 3 through 5 are flowcharts illustrating steps in a data transfer process. FIGS. 6 and 7 conceptually illustrate the progress of transferring an original image and RFID data RD from the original document 37 to a sheet 3. The RFID data includes various data, such as image data and text data. In the various data, unique data for identifying each sheet 3 with an RFID tag, confidential information, and user identification data which should be prevented from being copied too easily and whose uniqueness of the sheet should be reliably preserved are also contained.

The CPU 51 executes the data transfer process shown in FIGS. 3 through 5 when the user inputs an instruction to perform a data transfer on the operating unit 59, for example. By performing the data transfer process, the MFP 1 can scan an original image from the original document 37 while reading the RFID data RD from the RFID tag 39 and can form the above original image on the sheet 3 loaded in the tray 5 while writing the above RFID data RD to the RFID tag 7 of the same sheet 3.

(1) Selection Process

There are two types of data transfer processes in the preferred embodiment: a first transfer process and a second transfer process. The CPU 51 performs a selection process to determine whether to execute the first transfer process or the second transfer process.

Specifically, in S100 of FIG. 3 the CPU 51 determines whether the user has performed an input operation on the operating unit 59 to specify scanning of a conveyed original or to specify scanning of a stationary original. This determination can be made based on the existence of a detection signal received from a document sensor (not shown) disposed near the document tray 33, the intensity of incident light in the scanning unit 41, or the like. If the CPU 51 determines that the user has specified scanning of a conveyed original (S100: YES), the CPU 51 advances to S200.

In S200 the CPU 51 determines whether the storage capacity (available memory capacity) of the NVRAM 57 is greater than or equal to a reference value. If the storage capacity is greater than or equal to the reference value (S200: YES), in S300 the CPU 51 executes the first transfer process shown in FIG. 4. However, if the CPU 51 determines that the user specified scanning of a stationary original (S100: NO) or if the user specified scanning of a conveyed original but the storage capacity of the NVRAM 57 is less than the reference value (S100: YES, S200: NO), in S400 the CPU 51 executes the second transfer process shown in FIG. 5.

(2) First Transfer Process

The CPU 51 implements the first transfer process by executing the control steps shown in FIG. 4. In the first transfer process, after the RFID reader/writer 47 reads the RFID data RD from the RFID tag 39 of the original document 37 and stores the read RFID data RD in the NVRAM 57, the CPU 51 controls the RFID reader/writer 47 to give a restriction to the RFID data RD that remains in the RFID tag 39 of the original document 37 to restrict subsequent reading of the RFID data RD from the RFID tag 39 of the original document 37. After then, the CPU 51 controls the RFID reader/writer 47 to write the RFID data RD stored in the NVRAM 57 to the RFID tag 7 of the sheet 3.

More specifically, in S301 the CPU 51 controls the conveying mechanism 35 to convey one page of the original document 37 from the document tray 33 in order to execute scanning of a conveyed original. The CPU 51 controls the scanning unit 41 to scan an original image on the original document 37 and acquires original image data for one page. At this time, the RFID data RD is stored only in the RFID tag 39 of the original document 37, as shown in <S301> of FIG. 6.

In S303 the CPU 51 determines whether the original document 37 conveyed by the conveying mechanism 35 has an RFID tag 39. Specifically, the CPU 51 controls the RFID reader/writer 45 to attempt wireless communications with an RFID tag 39 while the original document 37 is being conveyed from the document tray 33 toward the scanning region of the scanning unit 41, and determines whether the original document 37 has an RFID tag 39 based on whether wireless communications were successful.

If the wireless communications failed, indicating that the original document 37 has no RFID tag 39 (S303: NO), in S323 the CPU 51 controls the pickup roller 9 to convey a single sheet 3 from the tray 5, controls the image-forming unit 15 and the like to form an image on the sheet 3 based on the original image data, and subsequently advances to S319. Hence, the CPU 51 does not perform a process to transfer the RFID data RD and does not place a restriction on the RFID tag 39 of the original document 37 in any way.

On the other hand, if the CPU 51 determines that the original document 37 has an RFID tag 39 based on successful wireless communications (S303: YES), in S305 the CPU 51 controls the RFID reader/writer 47 to read the RFID data RD, such as, unique data associated with the RFID tag 39 (a serial number, for example), from the RFID tag 39 of the original document 37 and stores the RFID data RD in the NVRAM 57. At this time, the RFID data RD is present in the RFID tag 39 of the original document 37 and the NVRAM 57, as illustrated in <S305> of FIG. 6. When a plurality of pages of the original document 37 are set in the document discharge tray 43, the CPU 51 differentiates each page of the original based on the unique data and reads the RFID data RD from RFID tags 39 of specific pages of the original document 37.

In S307 the CPU 51 controls the RFID reader/writer 47 to give a restriction to the RFID data RD that remains in the RFID tag 39 of the original document 37 to restrict subsequent reading of the RFID data RD from the RFID tag 39 of the original document 37. Specifically, the CPU 51 controls the RFID reader/writer 47 to delete the RFID data RD from the RFID tag 39 of the original document 37 discharged onto the document discharge tray 43, and subsequently advances to S309. After this process, the RFID data RD exists only in the NVRAM 57 and can no longer be read from the RFID tag 39, as illustrated in <S307> of FIG. 6.

In S309, as in S323 described above, the CPU 51 controls the image-forming unit 15 and the like to form an image on the sheet 3 based on the original image data. In S311 the CPU 51 determines whether the image was formed successfully. The CPU 51 makes this determination based on whether the sheet 3 has arrived at the fixing unit 17. Specifically, the CPU 51 determines that the image was formed successfully when the sensor 18 has detected the sheet 3 arriving at the fixing unit 17, and determines that the image was not formed successfully due to an error, such as the sheet 3 becoming jammed or the image-forming unit 15 having insufficient colorant, when the sensor 18 does not detect the sheet 3. <S309> of FIG. 6 shows a case in which the image was formed successfully.

When the CPU 51 determines that the image-forming process was completed successfully (S311: YES), in S313 the CPU 51 reads the RFID data RD from the NVRAM 57 and controls the RFID reader/writer 25 to begin writing this RFID data to the RFID tag 7 of the sheet 3 passing through the fixing unit 17.

In S315 the CPU 51 determines whether the writing process was successful based on the results of the data exchange between the RFID reader/writer 25 and the RFID tag 7. In other words, the CPU 51 determines that the writing process was successful when the RFID reader/writer 25 completed writing of the RFID data RD normally, and determines that the writing process was unsuccessful if the RFID reader/writer 25 could not write data due to the sheet 3 not having an RFID tag 7 or due to an error, such as noise or insufficient memory capacity of the RFID tag 7.

If the writing process was successful (S315: YES), in S317 the CPU 51 deletes the RFID data RD from the NVRAM 57. At this point, the RFID data RD exists only in the RFID tag 7 of the sheet 3, as indicated in <S311: YES, S315: YES> of FIG. 6.

However, if the image-forming process was unsuccessful (S311: NO) or if the writing process was unsuccessful (S315: NO), then in S321 the CPU 51 controls the RFID reader/writer 47 to remove the restriction placed on subsequent processes to read data from the RFID tag 39 of the original document 37. Specifically, the CPU 51 controls the RFID reader/writer 47 to rewrite the RFID data RD stored in the NVRAM 57 to the RFID tag 39 of the original document 37. In S317 the CPU 51 deletes the RFID data RD from the NVRAM 57. At this time, the RFID data RD exists only in the RFID tag 39 of the original document 37, as indicated in <S311: NO or S315: NO> of FIG. 6. In S319 the CPU 51 determines whether the above processes have been completed for all pages of the original document 37. When all pages of the original document 37 have been processed (S319: YES), the CPU 51 ends the current first transfer process and data transfer process.

(3) Second Transfer Process

The CPU 51 implements the second transfer process by executing the control steps shown in FIG. 5. In the second transfer process, after the RFID reader/writer 47 reads the RFID data RD from the RFID tag 39 of the original document 37 and writes the read RFID data RD to the RFID tag 7 of the sheet 3 without storing the RFID data RD in the NVRAM 57. Subsequently, the CPU 51 controls the RFID reader/writer 47 to give a restriction to the RFID data RD that remains in the RFID tag 39 of the original document 37 to restrict subsequent reading of the RFID data RD from the RFID tag 39 of the original document 37.

Specifically, in S401 the CPU 51 acquires one page worth of original image data by controlling the scanning unit 41 to scan an original image from the original document 37. Note that in the second transfer process, the scanning unit 41 moves along the document bed 29 while reading the original image on the original document 37 placed on the document bed 29. At this time, the RFID data RD is stored only in the RFID tag 39 of the original document 37, as indicated in <S401> of FIG. 7.

In S403 the CPU 51 determines whether the original document 37 has an RFID tag 39. Note that in the second transfer process, the CPU 51 controls the RFID reader/writer 47 to attempt wireless communications with an RFID tag 39 and determines whether the original document 37 has an RFID tag 39 based on the success of these wireless communications.

If the CPU 51 determines that the original document 37 does not have an RFID tag 39 due to failed wireless communications (S403: NO), in S417 the CPU 51 controls the pickup roller 9 to convey a sheet 3 from the tray 5 and controls the image-forming unit 15 and the like to begin forming an image on the sheet 3 based on the original image data, and subsequently advances to S415. In other words, the CPU 51 does not perform a process to transfer the RFID data RD, but leaves the RFID data RD in the RFID tag 39 of the original document 37 without restricting further access to the RFID tag 39.

On the other hand, if the CPU 51 determines that the original document 37 has an RFID tag 39 based on successful wireless communications (S403: YES), in S405 the CPU 51 controls the RFID reader/writer 47 to read the RFID data RD, such as, unique data associated with the RFID tag 39, from the RFID tag 39 and controls the image-forming unit 15 and the like to begin forming an image on the sheet 3 based on the original image data, as in S417 described above. Then, in S407 the CPU 51 determines whether the image was formed successfully according to the same method described for S311. <S407> of FIG. 7 shows a case in which the image was formed successfully.

When the CPU 51 determines that the image-forming process was successful (S407: YES), in S409 the CPU 51 controls the RFID reader/writer 47 to read the RFID data RD from the RFID tag 39 of the original document 37, controls the RFID reader/writer 47 to stored the read RFID data RD in the RAM 55, and controls the RFID reader/writer 25 to begin writing the RFID data stored in the RAM 55 to the RFID tag 7 of the sheet 3 passing through the fixing unit 17. At this time, the RFID data RD exist in both the RFID tag 39 of the original document 37 and the REID tag 7 of the sheet 3, as indicated in <S409> of FIG. 7.

In S411 the CPU 51 determines whether the writing process was successful according to the same method described in S315. When the writing process was successful (S411: YES), in S413 the CPU 51 controls the RFID reader/writer 47 to give a restriction to the RFID data RD that remains in the RFID tag 39 of the original document 37 to restrict subsequent reading of the RFID data RD from the RFID tag 39 of the original document 37. Specifically, the RFID reader/writer 47 deletes the RFD) data RD from the RFID tag 39 of the original document 37 discharged on the document discharge tray 43 and subsequently advances to S415. At this time, the RFID data RD exists only in the RFID tag 7 of the sheet 3 and can no longer be read from the RFID tag 39, as indicated in <S407: YES, S411: YES> of FIG. 7.

On the other hand, if the image-forming process was unsuccessful (S407: NO) or if the writing process was unsuccessful (S411; NO), the CPU 51 advances to S415 without giving a restriction to the RFID data RD that remains in the REID tag 39 of the original document 37. Accordingly, the RFID data RD exists only in the RFID tag 39 of the original document 37 at this time, as indicated in <S407: NO or S411: NO> of FIG. 7. In S415 the CPU 51 determines whether the above process has been performed for all pages of the original document 37. If all pages of the original document 37 have been processed (S415: YES), the CPU 51 ends the current second transfer process and data transfer process.

Effects of the Embodiment (1) The MFP 1 according to the preferred embodiment restricts further reading of data from the RFID tag 39 of the original document 37 after once performing a Process to read the RFID data RD in the RFID tag 39. In this way, the MFP 1 can transfer the RFID data RD to another sheet while preventing the unlimited production of sheets to which RFID data RD having the same content has been written.

(2) If the CPU 51 were to perform the process to write RFID data RD to the RFID tag 7 of a sheet 3 (S313 of FIG. 4, S409 of FIG. 5) prior to the image-forming process (S309 of FIG. 4, S405 of FIG. 5), then if the image is not formed successfully, the RFID data RD would be written to the RFID tag 7 of a sheet 3 that is no longer useful because a suitable image is not formed thereon. For this reason, the MFP 1 according to the preferred embodiment writes the RFID data RD to the RFID tag 7 of the sheet 3 after determining that the image was successfully formed on the sheet 3, as indicated in the flowcharts of FIGS. 4 and 5, thereby avoiding the above problem.

(3) As is clear from FIG. 6, the RFID data RD can only be read from one of the RFID tag 39 in the original document 37 and the RFID tag 7 in the sheet 3 at any one time in the first transfer process. Therefore, the MFP 1 of the preferred embodiment avoids situations in which RFID data RD having the same content is simultaneously stored in RFID tags of a plurality of sheets, thereby further reinforcing unique preservation of the RFID data RD.

Moreover, if the MFP 1 determines that the process for writing RFID data to the RFID tag 7 of a sheet 3 was unsuccessful in the first transfer process, the MFP 1 makes the RFID data RD in the RFID tag 39 of the original document 37 valid (removes the restriction thereon). Hence, the MFP 1 avoids the loss of sheets having RFID tags that store RFID data RD in such cases.

(4) In the first transfer process, there is a possibility that RFID data RD may be lost if the NVRAM 57 were to malfunction, for example, when the RFID data RD is stored only in the NVRAM 57, as shown in <S307> and <S309> of FIG. 6. Further, if the RFID data RD were stored in the RAM 55 instead, the RFID data RD would be lost if the power of the MFP 1 were switched off.

In the second transfer process, on the other hand, the RFID data RD is always stored in at least one of the RFID tag 7 of the sheet 3 and the RFID tag 39 of the original document 37, as illustrated in FIG. 7. Hence, this process can suppress the loss of RFID data RD. However, the second transfer process creates a condition in which the RFID data RD is stored simultaneously in both the RFID tag 7 of the sheet 3 and the RFID tag 39 of the original document 37, such as after S409. Accordingly, the first transfer process is preferable when it is desirable to ensure the uniqueness of the RFID data RD.

(5) Further, in the preferred embodiment, one of the first transfer process and the second transfer process is selected based on the reading method of the original document 37. If the scanning of the conveyed original is specified, the original document 37 is discharged onto the document discharge tray 43. In this case, it is highly possible that the original document 37 discharged onto the document discharge tray 43 is taken away soon by the user before the restriction is given to the original document 37. However, in the preferred embodiment, if the user has specified scanning of a conveyed original (S100: YES), the CPU 51 executes the first transfer process. In the first transfer step the restriction is given to the RFID data RD of the RFID tag 39 in the original document 37 at an earlier step than the second transfer process. Thus, above possibility becomes low.

Variations of the Embodiment

While the invention has been described in detail with reference to specific embodiments thereof, it would be apparent to those skilled in the art that many modifications and variations may be made therein without departing from the spirit of the invention, the scope of which is defined by the attached claims.

(1) In the preferred embodiment described above, the MFP 1 is configured to transfer the RFID data RD and the original image from the original document 37 to the sheet 3, as illustrated in FIGS. 6 and 7, but the present invention is not limited to this configuration. For example, the MFP 1 may be configured merely to transfer the RFID data RD to the sheet 3. The original image may be copied onto a different sheet than the sheet to which the RFID data RD was transferred. However, the MFP 1 according to the preferred embodiment can manage both the RFID data RD and the original image on the same sheet, similar to the original document 37.

(2) The MFP 1 according to the preferred embodiment restricts further processes to read RFID data by deleting the RFID data RD, but the present invention is not limited to this configuration. For example, the MFP 1 may overwrite the RFID data RD with other data or may restrict the RFID reader/writer 47 from reading the RFID data RD by writing to the RFID tag 39 prohibition data prohibiting such reading or data allowing only partial reading of the RFID data RD. However, the configuration of the preferred embodiment or the method of overwriting the RFID data RD can more reliably restrict further reading of the RFID data RD. On the other hand, the restriction on reading can easily be canceled using the configuration for writing prohibition data or the like, while such cancellation is not possible when the data has been deleted or overwritten.

(3) Further, while the MFP 1 of the preferred embodiment gives the restriction after the RFID data RD has been read one time, the present invention is not limited to this configuration. The restriction may be given after the RFID data RD has been read a prescribed number of times, for example.

(4) While the MFP 1 of the preferred embodiment determines that an image was formed successfully if the sheet 3 reaches the fixing unit 17, the present invention is not limited to this configuration. For example, a sensor (not shown) may be provided for detecting when the sheet 3 is discharged onto the discharge tray 23, and the MFP 1 may control the RFD reader/writer 25 to perform a writing process when this sensor has detected the sheet 3. However, the configuration of the preferred embodiment prevents a user from removing the sheet 3 from the discharge tray 23 before the writing process has been performed.

(5) The preferred embodiment described above gives an example of implementing the present invention with a standalone MFP 1, but the present invention is not limited to this configuration. For example, the image-forming system of the present invention may be configured of a standalone document-reading unit 27 and a separate image-forming device without the document-reading unit 27, whereby the two devices are connected and capable of performing bi-directional communications. Alternatively, the image-forming system may include a plurality of image-forming devices with a facsimile function (facsimile machines), whereby one facsimile machine (the MFP 1 in FIG. 2, for example) performs processes to read and to restrict RFID data, while another facsimile machine (the external device 73 in FIG. 2, for example, having the same functions as the MFP 1) performs a process to write this RFID data.

What is claimed is:

1. An image-forming system comprising:
    a data-reading unit configured to read data from a first storing member attached on an original medium;
    a first data-writing unit configured to write the read data to a second storing member attached on a recording medium;
    a deleting unit configured to delete the data stored in the first storing member after the data is read, in order to prevent the data stored in the first storing member from being read subsequently; and
    a second data-writing unit configured to rewrite the read data on the first storing member if the read data was not successfully written on the second storing member.

2. The image-forming system according to claim 1, further comprising:
    an image-reading unit configured to read an image formed on the original medium; and
    an image-forming unit that forms the read image on the recording medium.

3. The image-forming system according to claim 1, further comprising:
    an image-forming unit configured to form an image on the recording medium;
    a first determining unit configured to determine whether or not the image has been formed on the recording medium; and
    a preventing unit configured to prevent the first data-writing unit from writing the read data to the second storing member, if the first determining unit determines that the image has not been formed on the recording medium.

4. The image-forming system according to claim 1, wherein the deleting unit is configured to delete the data stored in the first storing member before the first data-writing unit writes the read data to the second storing member.

5. The image-forming system according to claim 4, further comprising a second determining unit configured to determine whether or not the read data has been written to the second storing member,
    wherein the second data-writing unit rewrites the read data based upon the determination of the second determining unit.

6. An image-forming system comprising:
    a data-reading unit configured to read data from a first storing member attached on an original medium;
    a data-writing unit configured to write the read data to a second storing member attached on a recording medium; and
    a deleting unit configured to-delete the data stored in the first storing member after the data is read and written to the second storing member, in order to prevent the data stored in the first storing member from being read subsequently.

7. An image-forming device comprising:
    a first radio frequency identification (RFID) device configured to read data from a first storing member attached on an original medium and configured to delete the data stored in the first storing member after the data is read, in order to prevent the data stored in the first storing member from being read subsequently; and
    a second radio frequency identification (RFID) device configured to write the data to a second storing member attached on a recording medium.

8. The image-forming device of claim 7, wherein the first RFID device is configured for two deleting modes, the two deleting modes being selected from a group consisting of deleting the data prior to the data being written on the second storing member and deleting the data after the data is written on the second storing member.

9. The image-forming device of claim 8, further comprising:
    a storage device configured to store the read data.

10. The image-forming device of claim 9, further comprising:
    a selecting unit configured to select a data transfer process.

11. The image-forming device of claim 9, wherein the data transfer process is selected based upon an available capacity in the storage device.

12. The image-forming device of claim 9, wherein the data transfer process is selected based upon a type of scanning, the type of scanning being selected from the group consisting of stationary scanning and conveyed scanning.

13. The image-forming device of claim 9, wherein the second RFID device is further configured to detect if the writing to the second storing member was successful, and wherein the first RFID device is further configured to rewrite the read data from the storage device to the first storing member if the writing to the second storing member was not successful.

* * * * *